Sept. 14, 1948.    J. W. BROWN, JR    2,449,052
HEAT EXCHANGER
Filed Jan. 13, 1945    2 Sheets-Sheet 1
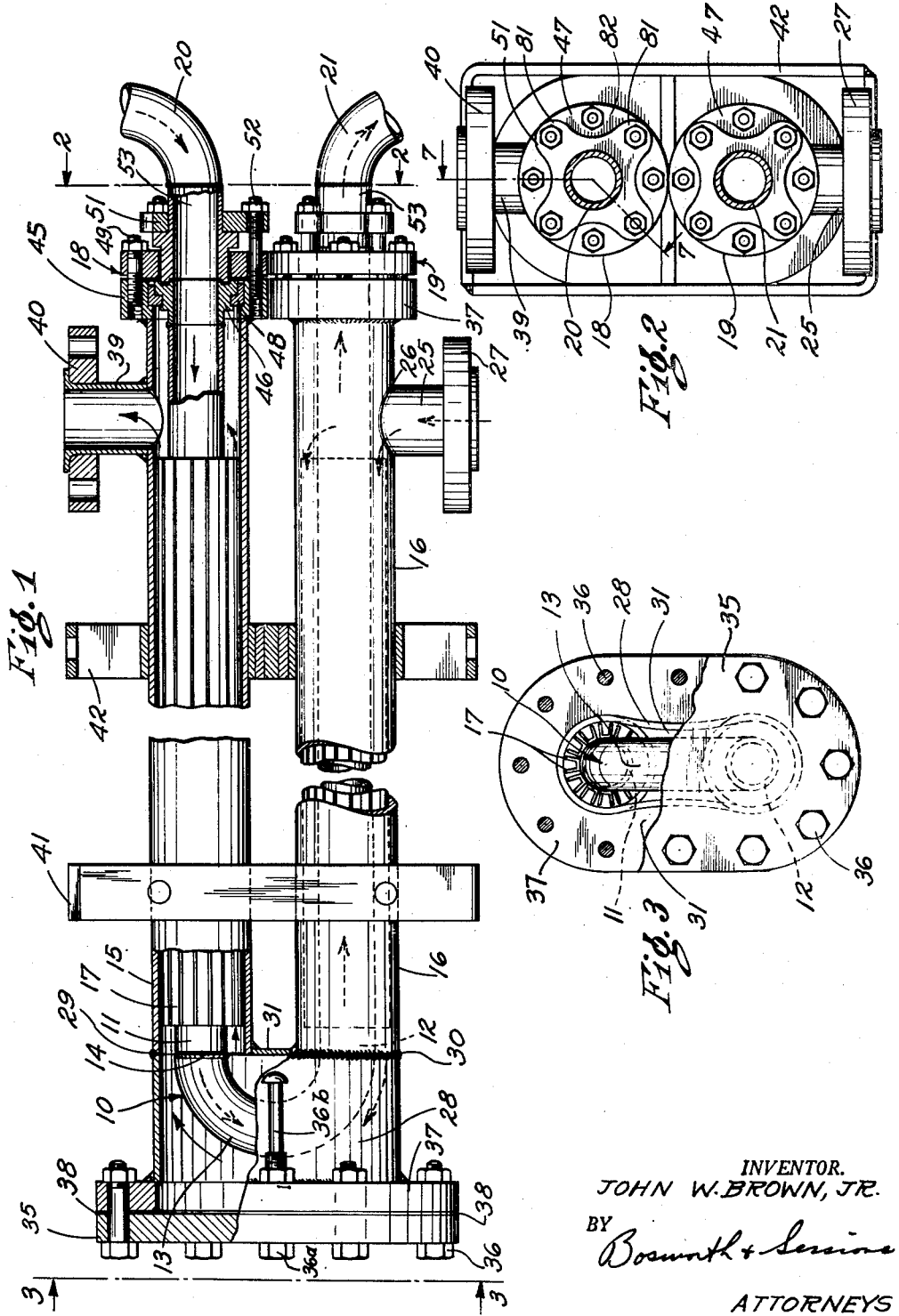
INVENTOR.
JOHN W. BROWN, JR.
BY
Bosworth & Sessions
ATTORNEYS Sept. 14, 1948.  J. W. BROWN, JR  2,449,052
HEAT EXCHANGER
Filed Jan. 13, 1945  2 Sheets-Sheet 2
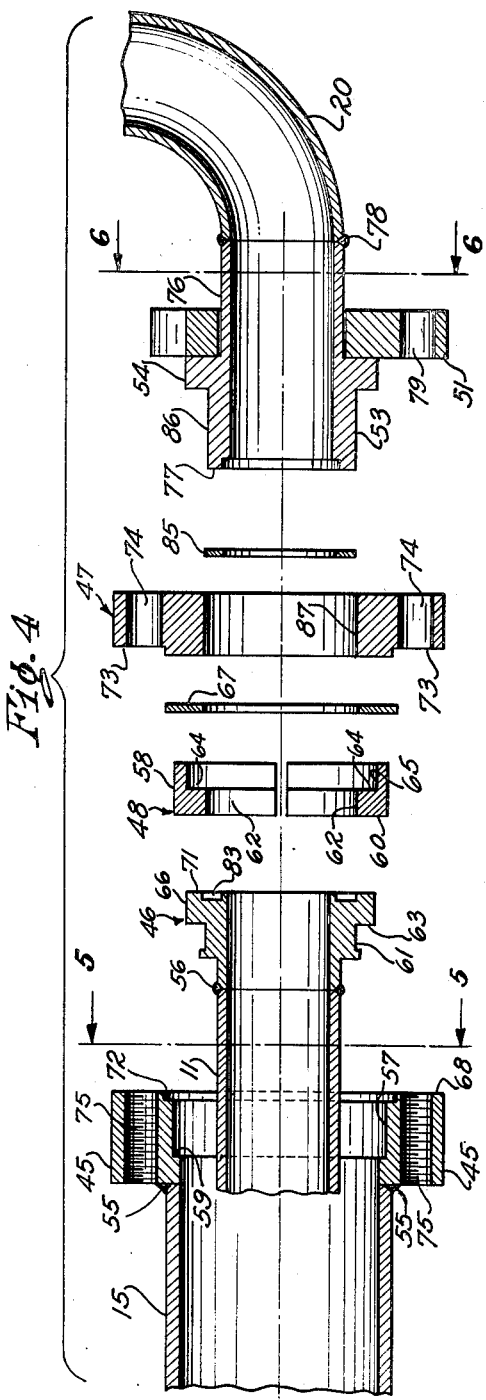
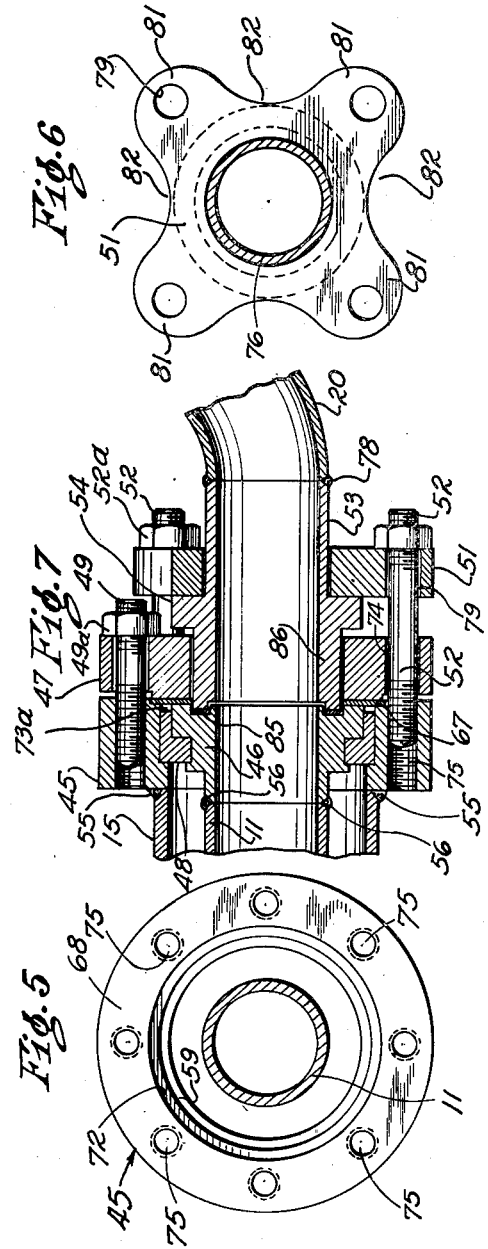
INVENTOR.
JOHN W. BROWN, JR.
BY
Bosworth + Sessions
ATTORNEYS Patented Sept. 14, 1948

2,449,052

UNITED STATES PATENT OFFICE 2,449,052

HEAT EXCHANGER

John W. Brown, Jr., Lakewood, Ohio, assignor to Brown Fintube Company, Elyria, Ohio, a corporation of Ohio Application January 13, 1945, Serial No. 572,627

4 Claims. (Cl. 285—20)

This invention relates to tubular connections and more particularly to connections or fittings for joining two tubes or pipes of different diameters. The connections or fittings are especially useful in heat exchangers, but it is to be understood that they may be employed for other purposes.

A general object of the invention is to provide an efficient connection for joining tubes of different diameters, which can be manufactured at relatively low cost and which will withstand extremely high pressures without leakage. Another object is to provide such a connection which readily can be assembled or disassembled without requiring any special tools or equipment. Another object is to provide such a connection, particularly for concentric tubes, in which no substantial torsional forces are placed on either the inner tube or the outer tube by the operations of connecting and disconnecting the connection. A further object is to provide an efficient and economical heat exchanger embodying such a tubular connection.

Another object is to provide a novel flanged head seal and flanged union, eliminating screw pipe fittings and screw pipe unions.

A further object is to provide a tube connection employing gasketed seals, and eliminating ground joints and all maintenance troubles common to ground joints. An additional object is to provide a construction in which the gaskets are renewable and fully retained, and wherein the joints may be inspected easily before sealing.

Still another object is to provide a heat exchanger connection in which seals may be made or broken with a small standard wrench, from the front, permitting close side-by-side installation of units in minimum space.

Still another object is to provide a substantially unitary compact fitting construction for sealing an inner tube to an outer tube and also sealing the inner tube to a connecting pipe.

Further objects and advantages of the invention will become apparent from the following description of a preferred form thereof, reference being made to the accompanying drawings in which Figure 1 is an elevation partly in section showing a double tube heat exchanger made according to my invention; Figure 2 is a front elevation of the heat exchanger shown in Figure 1; Figure 3 is a rear elevation with parts broken away, showing the heat exchanger of Figure 1; Figure 4 is an enlarged exploded view representing in longitudinal section the elements of the inner-tube connection and the connection between the inner and outer tubes of the heat exchanger; Figure 5 is a detail view, partially in cross-section, of the portion of the apparatus of Figure 4 to the left of the plane 5—5; Figure 6 is a detail view, partially in cross-section, of the portion of the apparatus of Figure 4 to the left of the plane 6—6 of Figure 4; and Figure 7 is an enlarged longitudinal sectional detail view substantially corresponding to Figure 4, representing the tube connections cut as indicated by line 7—7 of Figure 2. The corresponding sectionalized portion of Figure 1 is also represented as being cut as indicated by line 7—7 of Figure 2. Like reference characters are utilized throughout the drawing to designate like parts.

In the drawings I have illustrated a heat exchanger designed to employ my preferred form of tubular connection. This heat exchanger is of the hairpin type and comprises an inner hairpin or U-tube indicated generally at 10 and made up of two straight portions 11 and 12 connected by a return bend 13, preferably welded to the straight portions as indicated at 14, although unions or other means for connecting the return bend and the straight portions may be employed if desired. Shell tubes 15 and 16 surround the straight portions 11 and 12 of the hairpin tube 10. In order to increase the rate of interchange of heat between the commodity within the tubes 11 and 12 and the commodity surrounding these tubes and within the shell tubes 15 and 16, the straight portions 11 and 12 are preferably provided with fins 17 constructed in accordance with the teachings of my prior Patents No. 2,261,136 and No. 2,261,137.

The tubes 11 and 12 are provided at their outer or exposed ends with connections or fittings indicated generally at 18 and 19 by means of which inlet and outlet pipes 20 and 21, or connecting pipes may be sealed to the inner tubes 11 and 12 respectively. The fittings 18 and 19 serve in addition to connect the inner tubes to the outer tubes as will be explained in greater detail hereinafter. If the exchanger is designed for counterflow operation the other commodity may be supplied to the interior of the shell tube 16 through the inlet pipe 25 welded to the shell tube as shown at 26 and provided at its end with a conventional flanged connection as at 27. Fluid supplied through the inlet 25 flows in the direction of the arrows to the rear end of the exchanger where the tube 16 is connected to the tube 15 by means of a connecting member 28 welded to the ends of the tubes as indicated at 29 and 30, and a plate 31, welded to the tubes and to the member 28. A removable cover plate 35 is secured by bolts 36 to the flange 37 which is welded to the member 28. One of the bolts, indicated at 36a, preferably provided with a reduced-diameter, headed extension 36b thus providing a pivotal support whereby the cover plate can be pulled out of engagement with the other bolts, and then swung about the bolt 36a as a pivot to give access to the interior of the exchanger. The cover plate may be secured in displaced position by one of the bolts 36 adjacent the bolt 36a. A suitable gasket 38 may be provided between the cover plate and the flange in order to make a leak-proof connection. Thus fluid may flow to the rear of the heat exchanger through the tube 16 around the outside of the return bend 13 and into the tube 15, thence within the tube 15 to the outlet pipe 39 which, like the inlet pipe 25, is provided with a conventional flanged union 40. With such an arrangement, counterflow of the commodities in the inner and outer tubes will take place. If desired, concurrent flow may be obtained merely by reversing the inlet and outlet connections for either the inner tube or the outer tubes. Several exchangers may be connected together in series if desired, and may be supported by brackets 41 and 42.

One of the fittings 18 and 19, which I provide for making the necessary connection between the ends of the shell tubes 15 and 16 and the legs 11 and 12 of the hairpin tube, is shown on an enlarged scale in Figures 4 and 7. The connection between the shell tubes and the hairpin tube must be leakproof under high pressures and widely varying temperature conditions, must accurately position the tubes with respect to each other, and must be designed so that it can be assembled and demounted without difficulty. These and other advantageous results I attain by providing in each fitting or connection, e. g. in the fitting 18, an end flange 45 for the outer tube 15, an enlarged end or flange 46 for the inner tube 11, a sealing ring 47, a split locking ring 48, and clamping or securing studs or screws 49. For enabling the same fitting 18 to seal the connecting pipe 20 to the inner tube 11, I provide therein a clamping ring 51, securing means such as studs or screws 52, and an end member 53 for the connecting pipe 20, having a collar 54.

The end flange 45 of the outer tube 15 may be integral with the remainder of the tube 15, but is preferably welded thereto as shown at 55. Similarly the enlarged end portion or flange 46 of the inner tube 11 may be integral with the remainder of the tube 11, or may be a separate piece welded thereto as shown at 56 to form a unitary construction. The split locking ring 48 is provided for locating the tube 11 concentrically within the outer tube 15 and, also, for the purpose of preventing longitudinal motion of the tube 11 into the tube 15 when the sealing ring 47 is to be drawn against the sealing surfaces of the tubes. To this end the outer tube 15 is counter-bored within the end portion of the flange 45 to provide an enlarged inner-diameter portion 57 fitting the outer surface 58 of the split locking ring 48, and to provide an outwardly facing shoulder 59 against which the surface 60 of the ring 48 is adapted to bear. Furthermore, the enlarged end portion 46 of the inner tube 11 is provided with a cylindrical portion 61 having such an outer diameter as to fit within the inner surface 62 of the split locking ring 48 and is provided with a back surface or inwardly facing shoulder 63 adapted to bear against a surface 64 of the split locking ring 48.

Preferably the end portion 46 of the inner tube 11 is grooved so that the cylindrical surface 61 forms the bottom of an annular groove adapted to receive the inner edges of the split locking ring 48 for holding it more conveniently when the connection is being assembled or disassembled. Furthermore, in order to provide for more convenient assembly, the locking ring 48 is preferably also counter-bored so that the surfaces 64 form an inner shoulder, and a larger inner-diameter portion 65 is provided, adapted to fit the outer surface 66 of a portion of greater diameter in the end 46 of the inner tube 11. In this manner the split locking ring 48 is provided with what may be called an L-shaped cross-section in which the leg portion of the L along the surface 65 lies between the inner surface 57 of the counter-bore in the outer tube 15 and the outer surface 66 of the end portion of the inner tube 11.

In order to avoid the necessity for a ground joint, a gasket 67 is preferably provided, which is adapted to form a seal between the end surface 68 of the flange portion 45 of the outer tube 15 and the end surface 71 of the end portion or member 46. In order to receive the gasket 67 and to increase the ease of assembly, the end of flange 45 is preferably counter-bored to form a recess 72. The sealing ring 47 is similarly set back as at 73. The gasket may be of any conventional material, or if desired a ring of metal, such as soft iron, may be urged against annular sealing surfaces on either side of the clearance space 73a. The sealing surfaces 68 and 71 on the outer and inner tubes, respectively, are preferably disposed in substantially the same plane, adjacent the ends of the respective tubes (the word "adjacent" being used here and in the claims to mean that the sealing surfaces are at or near the ends of the tubes).

The sealing ring 47 and the flange 45 are provided with appropriate holes 74 and 75, respectively, for receiving the bolt or screw means 49. Preferably, however, the holes 75 in the flange 45 are threaded in order that the securing means 49 may take the form of studs, provided with suitable nuts 49a as shown. Ordinarily the nuts are employed in the assembly and disassembly of the joint, the studs remaining fixed except when they require replacement because of wear or damage. For reasons which will immediately appear, however, not all of the holes 74 and 75 have the studs 49 passing through them. In the specific arrangement shown by way of illustration there are eight such holes and only four screws and nuts are employed for clamping the sealing ring 47 against the gasket 67.

The clamping ring 51 is fitted around the neck 76 of the end fitting or portion 53 of the connecting pipe 20, and the end surface 77 thereof is adapted to fit against the end 46 of the inner tube 11 to form a seal, preferably a gasketed seal in order to avoid the necessity for ground joints. The arrangement is such that the collar or enlargement 54, which is preferably integral with the end fitting 53, which lies between the end sealing surface 77 and the clamping ring 51. In order that the clamping ring 51 may be placed around the neck 76 of the connecting pipe 20 without employing a split ring construction, it is preferable to utilize an originally separate portion 53 to form the end of the connecting pipe 20 and to join it to the remainder of the connecting tube 20 by means of a weld, as shown at 78, after the ring 51 has been slipped over the neck 76. In this manner it is possible to form the connecting pipe with an elbow or to utilize return bends in case it is desired to use a bank of heat exchanger units.

In order to secure the clamping ring 51, I preferably employ the longer studs or screws 52, which are adapted to pass through openings 79 in the clamping ring 51, through the remaining openings 74 and 75 in the sealing ring 47 and the flange 45 of the outer tube 15 respectively. The four screws 52 are threaded into the openings 75 in the flange 45 which are not occupied by the shorter studs 49 serving to secure the sealing ring 47, and nuts 52a are employed to clamp the ring 51. In order to give access to the shorter cap screws 49, the ring 51 is preferably formed with ears 81, leaving spaces 82 between the ears exposing the nuts 49a.

Although the entire end surface of the end portion 46 of the inner tube 11 may be in a single plane, enabling a single gasket to seal the connection between the inner and outer tubes and also to seal the connection between the inner tube 11 and the connecting pipe 20, I consider it preferable to machine the end portion 46 of the inner pipe 11 so as to form a recessed portion 83 having suitable diameter to receive the end 77 of the end member 53 of the connecting pipe 20, and to receive a separate gasket 85 for sealing the joint between the inner tube 11 and the connecting pipe 20, thus avoiding damage to the gasket 67 in case the connecting pipe and the inner tube are to be disassembled without disassembling the inner tube and the outer tube. Furthermore, the recess 83 serves to retain the gasket 85. In order to provide a sturdier connection, the portion 86 of pipe 20 preferably has a greater outside diameter than the remainder of the connecting pipe 20.

It is to be observed that no screw pipe fittings or unions whatsoever are required so that there is no danger of subjecting any of the tubes or pipes to torsion during the assembly or disassembly operations regardless of the experience or carefulness of workmen performing the operation. Furthermore, since no such screw pipe fittings are required, which necessarily have large diameter nuts, it is unnecessary to use any long-handled wrenches; and simple standard short-handled spanners may be employed for making or breaking the seals between the inner tube and the connecting pipe, and between the inner and outer tubes. The avoidance of the necessity of such long-handled wrenches greatly increases the compactness of the assembly since it is unnecessary to provide sufficient clearance space between the pipes 20 and 21, between the tubes 11 and 12, and between the tubes 14 and 15 to permit use of long-handled wrenches. Furthermore, it is unnecessary to allow great space between separate heat exchanger units in case a bank of such units as illustrated in Figure 1 is to be employed.

As noted above there are two separate seals, namely, one seal between the inner tube 11 and the connecting pipe 20, and the other seal between the inner tube 11 and the outer tube 15. Each of these seals may be made or broken independently of the other. Thus when the entire apparatus is to be assembled with the parts arranged as shown in Figure 4, the seal between the inner and outer tubes may be tightened first by separating the halves of the split locking ring 48 and placing the portions 62 in the annular groove 61 of the end portion 46 of the inner tube 11. The tube 11 is then moved toward the left, causing the split locking ring 48 to slide into the counter-bore 57 of the outer tube 15 until the surfaces 59 and 58 come into abutment, limiting further inward motion of the inner tube 11. Thereupon, the sealing ring 47 may be drawn against the gasket 67 by means of the nuts 49a. The seal between the inner pipe 11 and the connecting pipe 20 may then be made by placing the gasket 85 in the recess 83 of the inner tube 11, and clamping the end surface 77 of the connecting pipe 20 against the gasket 85 by means of the nuts 52a. Since the split locking ring 48 serves to limit inward motion of the inner tube 11 within the outer tube 15, the nuts 52a serve to draw the sealing surface 77 of the connecting pipe 20 against the sealing surface 83 of the inner tube 11 although the cap screws 52 are not directly connected to the inner tube 11. It may be observed that the sealing ring 47, having an opening 87 adapted to receive the portion 86 of the connecting pipe 20, serves to center the end of the connecting pipe with respect to the end of the inner tube.

If for any reason it should be desired to tighten the seal between the inner tube 11 and the connecting pipe 20 before the seal is tightened between the inner and outer tubes, the nuts 52a may be drawn up before the nuts 49a.

The apparatus may be disassembled by carrying out the operations in reverse manner. Thus when the nuts 52a have been removed and the inner tube 11 has been moved to the right a short distance, the halves of the locking ring 48 will be separated, enabling the inner tube 11 to be moved to the left for disassembly of the complete apparatus by removing the inner tube 11 if desired. Obviously, when a hairpin tube as shown in Figure 1 is employed, the connection with the shell tube at the end of the tube 12 should be made or broken at the same time as the similar connections for tube 11.

In the particular heat exchanger shown, the hairpin tube can then be removed from the two shell tubes by swinging the cover plate 35 to one side, using the bolt 36a as a pivot. Then the hairpin tube can be pulled out of the two U-tubes through the opening at the rear of the exchanger made by removing the cover plate 35. In exchangers wherein the return bend of the hairpin tube is connected to the straight portions thereof by couplings or unions, then if desired the straight portions of the hairpin tube can be separately removed from the shell tubes by disconnecting them from the return bend, breaking the connection between the shell tubes and the straight portions as described above and pulling the tubes outwardly from the front end of the exchanger, i. e., to the right in the drawing. Thus my fitting or connection is adapted to heat exchangers of various types as well as being useful in other environments where it is desired to connect tubes or pipes of different diameters.

As explained above, my fittings may be tightened or loosened merely by tightening or loosening the relatively small nuts on screws 49 and 52. The elimination of large nuts and unions makes possible a compact construction and greatly increases the ease of assembly and demounting. Only small wrenches are required. Thus no severe torsional strains or stresses can be placed on either the shell tube or the fin tube in the operation of tightening the joint, nor is either tube placed under compression or tension in making the joint. The hairpin tube is held fixedly in proper position with respect to the shell tubes by the connection, yet the tube is free to expand and contract under the influence of temperature changes without placing any strain upon the connection. The gaskets can be replaced readily when necessary and the sealing surfaces can be inspected and cleaned immediately before the gasket and sealing ring are placed in position. The parts are shaped so that they can be formed and machined at relatively low cost and with ordinary production methods.

Those skilled in the art will appreciate that various changes and modifications can be made in my invention without departing from the spirit or scope thereof. It is therefore to be understood that my patent is not limited to the preferred form of my invention described herein, or any manner other than by the appended claims.

I claim:

1. In a heat exchanger embodying an outer tube and an inner tube adapted to join a connecting pipe, means for connecting the inner tube to such a pipe and to the outer tube comprising an outwardly facing shoulder near the end of the outer tube, an enlarged end on the inner tube having a maximum diameter less than the minimum diameter of the outer tube and providing an inwardly facing shoulder near the end of the inner tube, interlocking means adapted to engage between the shoulder of the outer tube and the shoulder of the inner tube for limiting inward movement of the inner tube in the outer tube, a sealing surface adjacent one end of the outer tube, a sealing surface on the enlarged end of the inner tube, a sealing ring adapted to seal against the sealing surfaces of both said tubes, said connecting pipe having a sealing surface adjacent one end thereof, means connected to said outer tube for drawing said sealing ring simultaneously against said inner and outer tube sealing surfaces, and means connected to said outer tube for drawing the connecting pipe into sealing engagement with the inner tube.

2. A union for connecting inner and outer concentric tubes and for connecting a connecting pipe to the inner tube, comprising an outwardly facing shoulder near one end of the outer tube, an inwardly facing shoulder near one end of the inner tube, a split locking ring adapted to fit between the shoulder of the outer tube and the shoulder of the inner tube for limiting inward movement of the inner tube in the outer tube, a sealing surface on the outer tube, a sealing surface on the inner tube disposed adjacent the sealing surface on the outer tube, a sealing ring adapted to seal against the sealing surfaces of both said tubes, the connecting pipe having a sealing surface adjacent one end thereof, means connected to the outer tube for drawing said sealing ring simultaneously against said inner and outer tube sealing surfaces, and means connected to the outer tube for drawing the connecting pipe into sealing engagement with the inner tube.

3. A union for connecting inner and outer concentric tubes and for connecting a connecting pipe to the inner tube, comprising an outwardly facing shoulder near one end of the outer tube, an inwardly facing shoulder near one end of the inner tube, a split locking ring adapted to fit between the shoulder of the outer tube and the shoulder of the inner tube for limiting inward movement of the inner tube in the outer tube, a sealing surface on the outer tube, a sealing surface on the inner tube disposed adjacent the sealing surface on the outer tube, a sealing ring adapted to seal against the sealing surfaces of both said tubes, the connecting pipe having a sealing surface adjacent one end thereof, the outer tube having an outwardly extending flange, screw means engaging said flange and said sealing ring for drawing said sealing ring simultaneously against said inner and outer tube sealing surfaces, and screw means engaging said flange and passing through openings in said sealing ring for drawing the connecting pipe into sealing engagement with the inner tube.

4. A union for connecting inner and outer concentric tubes comprising an outwardly facing shoulder near the end of the outer tube, an enlarged end on the inner tube having a maximum diameter less than the minimum diameter of said outer tube and providing an inwardly facing shoulder near the end of the inner tube, a split locking ring adapted to engage between the shoulder of the outer tube and the shoulder of the inner tube for limiting inward movement of the inner tube in the outer tube, a sealing surface adjacent one end of the outer tube, a sealing surface on the enlarged end of the inner tube, a sealing ring adapted to seal against the sealing surfaces of both said tubes, and means connected to said outer tube for drawing said sealing ring simultaneously against said inner and outer tube sealing surfaces.

JOHN W. BROWN, Jr.

REFERENCES CITED

The following references are of record in the file of this patent:

UNITED STATES PATENTS

| Number | Name | Date |
|---|---|---|
| 1,497,652 | Browne | June 10, 1924 |
| 1,869,739 | Dean et al. | Aug. 2, 1932 |
| 2,087,179 | Barker | July 13, 1937 |